US012754654B2

(12) United States Patent
Ezaki et al.

(10) Patent No.: US 12,754,654 B2
(45) Date of Patent: Oct. 6, 2026

(54) DISPLAY CONTROL DEVICE AND DISPLAY CONTROL PROGRAM

(71) Applicant: Faurecia Clarion Electronics Co., Ltd., Saitama (JP)

(72) Inventors: Jitsu Ezaki, Saitama (JP); Naoya Baba, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 258 days.

(21) Appl. No.: 18/599,720

(22) Filed: Mar. 8, 2024

(65) Prior Publication Data

US 2024/0329800 A1 Oct. 3, 2024

(30) Foreign Application Priority Data

Mar. 31, 2023 (JP) ................................ 2023-057153

(51) Int. Cl.
*G06F 3/048* (2013.01)
*G06F 3/04817* (2022.01)
*G06F 3/0485* (2022.01)
*G06F 9/451* (2018.01)

(52) U.S. Cl.
CPC ........ *G06F 3/04817* (2013.01); *G06F 3/0485* (2013.01); *G06F 9/451* (2018.02)

(58) Field of Classification Search
None
See application file for complete search history.

(56) References Cited

U.S. PATENT DOCUMENTS 6,600,936 B1 7/2003 Kaerkkaeinen et al.
2011/0202834 A1* 8/2011 Mandryk ............ G06F 3/04883 715/800
2016/0004425 A1* 1/2016 Yoon .................. G06F 3/04855 715/763
2016/0070434 A1* 3/2016 Clark ........................ G06F 8/38 715/762
2020/0059568 A1* 2/2020 Satake ............... H04N 1/00427
2020/0110528 A1 4/2020 Mak et al.
2020/0326850 A1 10/2020 Ezaki
2020/0327868 A1 10/2020 Ezaki
(Continued)

FOREIGN PATENT DOCUMENTS

JP 2000231371 A 8/2000
JP 2020102084 A 7/2020
(Continued)

*Primary Examiner* — Tuan S Nguyen
(74) *Attorney, Agent, or Firm* — Reising Ethington P.C.

(57) ABSTRACT

In a screen on which a portion of objects among a plurality of objects arranged in a virtual space are displayed, reduction in object visibility by a user can be suppressed even when an object is scrolled in an off-screen direction. The operation reception unit receives scrolling operations on a screen in which a portion of the objects among a plurality of objects arranged in a virtual space are displayed. The area updating unit updates an area within the virtual space displayed on the screen in response to a scroll amount received by the operation reception unit. The object updating unit changes at least either an object shape or size when, in an area updated by the area updating unit, there is an object partially outside this area, so that the object fits within this area.

14 Claims, 15 Drawing Sheets

(56) References Cited

U.S. PATENT DOCUMENTS

| | | | | |
|---|---|---|---|---|
| 2021/0286510 | A1* | 9/2021 | Tyler | G06F 3/0481 |
| 2022/0050592 | A1 | 2/2022 | Ezaki | |
| 2023/0017397 | A1 | 1/2023 | Ezaki et al. | |

FOREIGN PATENT DOCUMENTS

| | | | |
|---|---|---|---|
| JP | 2020173685 | A | 10/2020 |
| JP | 2020173686 | A | 10/2020 |
| WO | WO2010089805 | A1 | 8/2010 |

* cited by examiner

DISPLAY CONTROL DEVICE AND DISPLAY CONTROL PROGRAM

TECHNICAL FIELD

The present invention generally relates to a display control device and a display control program.

BACKGROUND

Display control devices are known that display a plurality of objects onto a screen.

For example, Patent Document 1 (US 2020/0110528 A) describes a display control device in which a portion of the widgets among a plurality of widgets aligned in a prescribed order are displayed on a screen. In this display control device, widgets on-screen are displayed as scrolling by changing a framing area in response to a scrolling operation.

In the display control device described in Patent Document 1, when a widget positioned at an end of the screen is scrolled in an off-screen direction, only a portion of the widget ceases to be displayed. In such a state, it becomes difficult for users to see the widget.

In light of the circumstances described above, an object of the present application is to provide a display control device and display control program in which reduction in object visibility can be suppressed even when an object such as a widget is scrolled in an off-screen direction.

SUMMARY

The display control device according to one embodiment of the present application includes an operation reception unit, an area updating unit, and an object updating unit. The operation reception unit receives scrolling operations on a screen in which a partial area of a virtual space is displayed. A plurality of objects is arranged in the virtual space and some of the plurality of objects in the partial area are displayed on the screen. The area updating unit updates the partial area within the virtual space displayed on the screen in response to a scroll amount received by the operation reception unit. The object updating unit changes shape or size of the object so that the object fits within the partial area if the object is predicted to extend outside of the partial area updated by the area updating unit.

According to one embodiment of the present application, a display control device and display control program are provided in which reduction in object visibility can be suppressed even when an object such as a widget is scrolled in an off-screen direction.

DETAILED DESCRIPTION OF EMBODIMENTS

The following description relates to a display control device and a display control program of one embodiment according to the present application. Note that common or corresponding elements are marked with the same or similar reference codes, and duplicate descriptions are simplified or omitted as appropriate.

One example of the display control device according to one embodiment of the present application is an in-vehicle apparatus, including, for example, a navigation device or IVI (in-vehicle infotainment). Note that the display control device is not limited to in-vehicle apparatuses, and may be a device of another form such as a smartphone, feature phone, tablet terminal, personal computer (PC), personal digital assistant (PDA), portable navigation device (PND), handheld gaming device, and the like.

Figure 1:
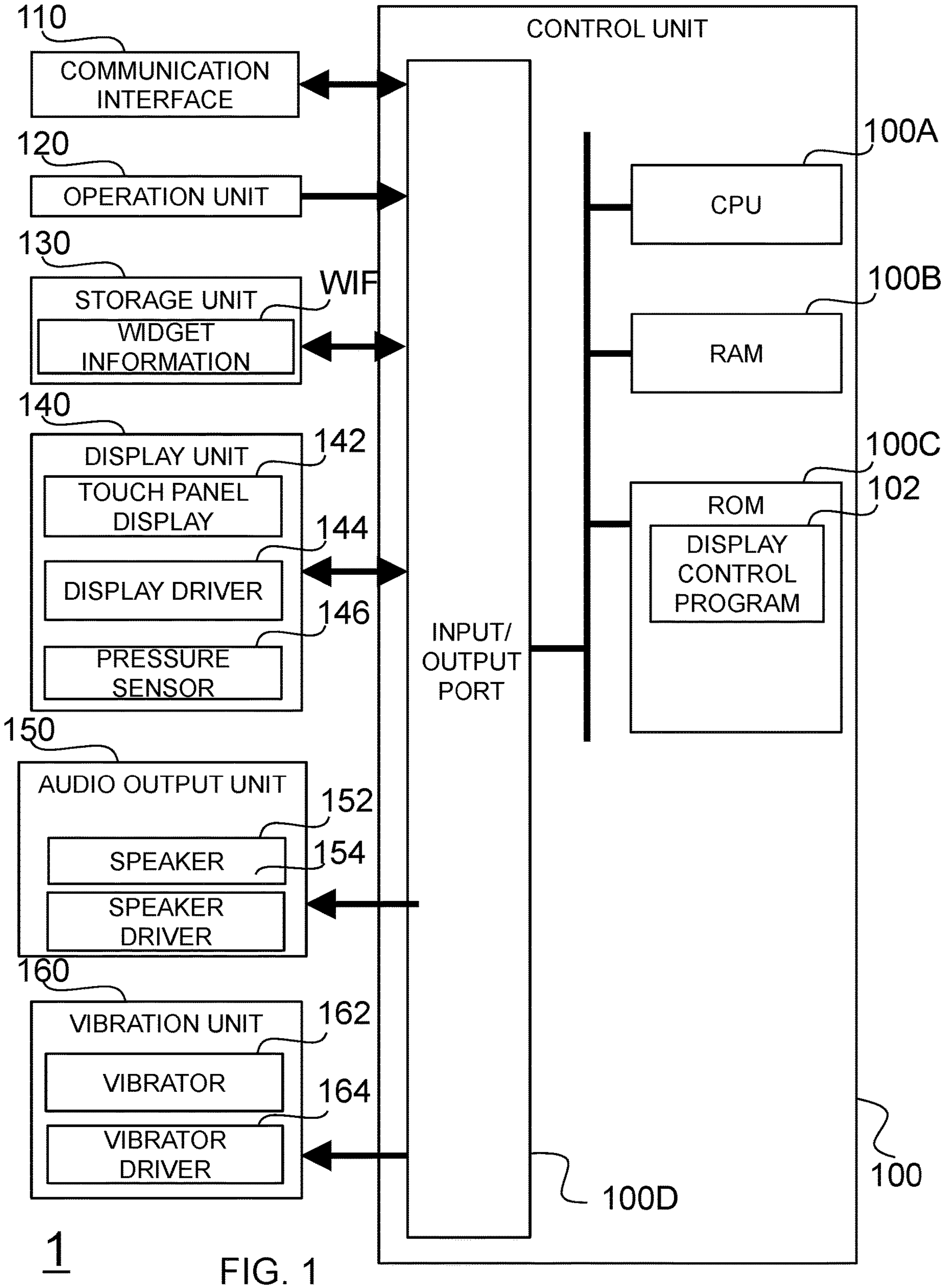
FIG. 1 is a block diagram showing a configuration of a display control device according to one embodiment of the present application.

FIG. 1 is a block diagram showing a configuration of a display control device 1 according to one embodiment of the present application. As shown in FIG. 1, the display control device 1 includes a control unit 100, a communication interface unit 110, an operation unit 120, a storage unit 130, a display unit 140, an audio output unit 150, and a vibration unit 160. FIG. 1 diagrammatically depicts the primary constituent elements necessary to describe the present embodiment, and omits diagrammatical depiction of some constituent elements, a housing for example, that are essential constituent elements of the display control device 1.

The control unit 100 controls the entire display control device 1. The control unit 100 is configured, for example, of a microcomputer composed of a CPU 100A, a RAM (random access memory) 100B, a ROM (read only memory) 100C, an I/O port 100D, and a bus line connecting these ports.

The CPU 100A reads in a program stored in the ROM 100C, decompresses the program in a work area saved on the RAM 100B, and controls the display control device 1 according to this program.

The program executed by the control unit 100 includes a display control program 102 according to one embodiment of the present application.

The CPU 100A may be a single processor or a multiprocessor, however, the control unit includes at least one processor. When configured to include a plurality of processors, the control unit 100 may be packaged as a single device or may be configured of a plurality of physically separate devices within the display control device 1.

The ROM 100C is non-volatile memory for storing data and various programs including the display control program 102. The ROM 100C is, for example, flash memory. The display control program 102 may be stored in the storage unit 130, described below.

Figure 2:
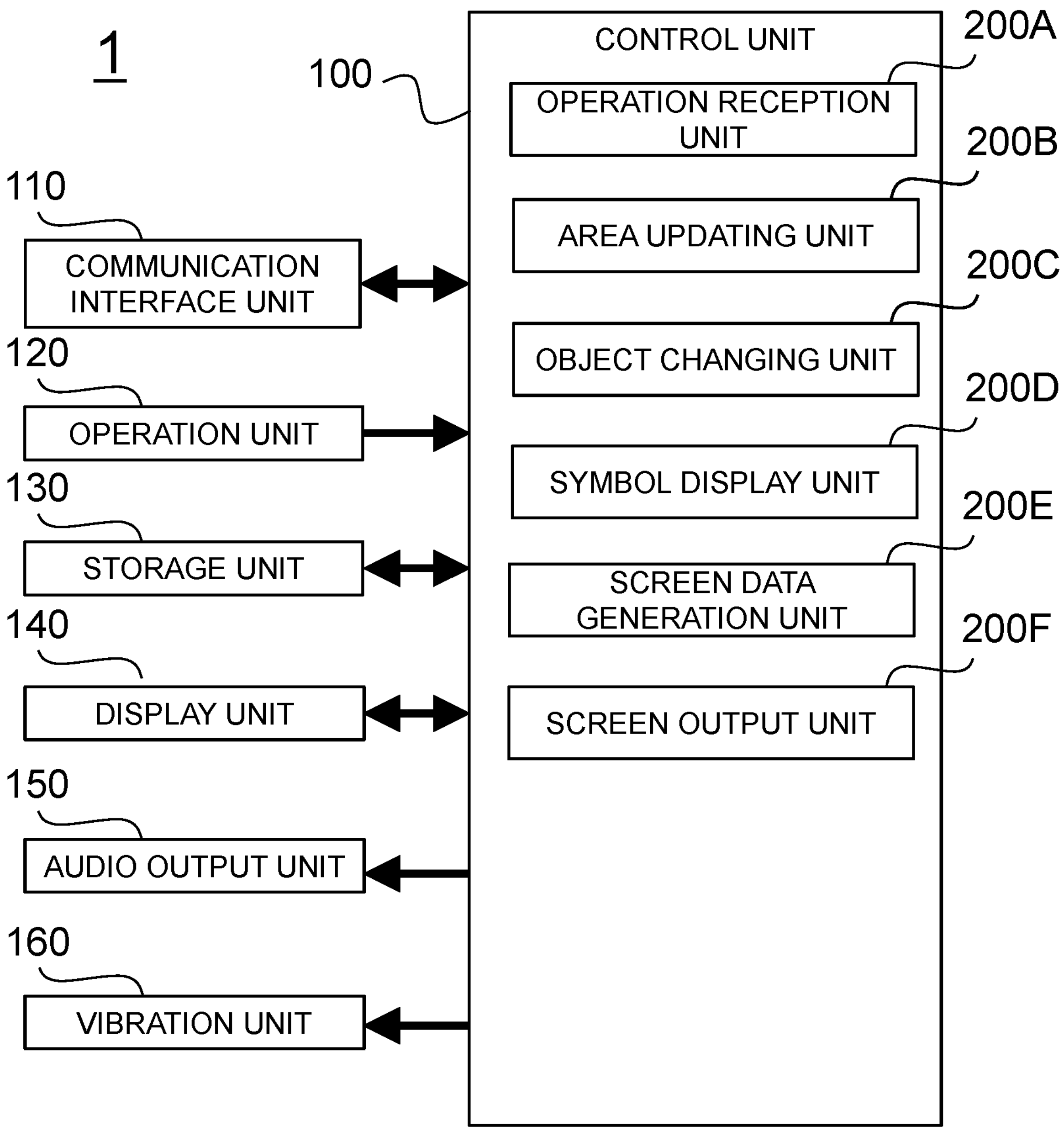
FIG. 2 is a functional block diagram of the display control device according to one embodiment of the present application.

FIG. 2 is a functional block diagram of the display control device 1. The control unit 100 works with each unit of the display control device 1 to execute the functional blocks.

The control unit 100 has, as functional blocks, an operation reception unit 200A, an area updating unit 200B, an object changing unit 200C, a symbol display unit 200D, a screen data generation unit 200E, and a screen output unit 200F. Each functional block is implemented by the display control program 102, which is software. Each functional block may be partially or wholly implemented by hardware such as a dedicated logic circuit.

The operation reception unit 200A detects various touch operations on a screen, such as a touch-on, touch-off, flick, swipe, and drag. In the present embodiment, displays on the screen are scrolled via a swipe. As such, swipe is one type of scroll operation. "Swipe" may also be called "slide".

Furthermore, the operation reception unit 200A detects coordinates on the touch-operated screen.

The operation reception unit 200A receives, as one example of an action, scrolling operations on a screen in which a portion of the objects in a partial area of a virtual space among a plurality of objects arranged in the virtual space are displayed. Hereinafter, the reference alphanumeric VS1 is added to "virtual space". A virtual space VS1 is a two-dimensional or three-dimensional virtual space.

An object is a display on the screen symbolizing an application type or information processed by the application, and is variable in shape and size. Examples include widgets, icons, thumbnail images, pop-ups, lists, information display windows, and the like. In the present embodiment, a widget is a display including the interface components of a GUI (graphical user interface), wherein, for example, results processed by the application which correspond to the widget are displayed, and a reception portion for receiving instructions to be processed by the application is laid out. Objects may also be called contents.

The area updating unit 200B updates an area within the virtual space VS1 displayed on the screen in response to a scroll amount received by the operation reception unit 200A. Hereinafter, a partial area displayed on the screen within the virtual space VS1 is denoted "area R1".

The object changing unit 200C changes at least either an object shape or size when, in an area R1 updated by the area updating unit 200B, there is an object partially outside the area R1, so that the object fits inside the area R1.

In other words, the display control program 102 receives a scrolling operation on the screen, on which a portion of objects in the area R1 among a plurality of objects arranged in the virtual space VS1 is displayed, the area R1 updates in response to a received scroll amount, and at least either an object shape or size is changed when, in the updated area R1, there is an object partially outside the area R1, so that the object fits within the area R1 with this series of processes being executed on the display control device 1, one example of which is a computer.

Execution of this display control program 102 allows reduction in object visibility to be suppressed even when an object is scrolled in an off-screen direction. Details of the display control program 102 are described below.

In addition, the display control device 1, one example of which is a computer, executes a display control method according to one embodiment of the present application using the display control program 102.

The symbol display unit 200D displays symbols respectively representing the plurality of objects so that users are able to intuitively grasp the status of objects, as relating to the screen display.

The screen data generation unit 200E generates screen data in the area R1.

The screen output unit 200F outputs screen data generated by the screen data generation unit 200E on the screen.

The I/O port 100D connects the control unit 100 with each unit (specifically, the communication interface unit 110, the operation unit 120, the storage unit 130, the display unit 140, the audio output unit 150, and the vibration unit 160).

The communication interface unit 110 is an interface that handles communication processing with other terminal devices. The display control device 1 is connected to other terminal devices by the communication interface unit 110 via a communication line for a public line or a closed network such as a VPN (virtual private network), enabling intercommunication.

The operation unit 120 is an operation member such as a dial, button, or switch for users to operate the display control device 1.

The storage unit 130 is an auxiliary storage device such as an HDD (hard disk drive) or SSD (solid state drive) that stores various programs and data.

The storage unit 130 stores data for displaying widgets, being one example of an object. For convenience, the reference alphanumeric W is added to "widget".

A widget W stored in the storage unit 130 includes, for example: widgets for conducting display related to navigation functions, widgets for displaying an overhead image of a vehicle when parked, widgets for operating the audio functions of in-vehicle apparatuses including navigation devices, widgets for selecting radio stations and the like, widgets for adjusting the air temperature and air volume of an air conditioner installed in the vehicle, and widgets for displaying and setting various information relating to the vehicle (speedometer, tachometer, and the like).

The display unit 140 has a touch panel display 142 and a display driver 144 that drives the touch panel display 142. The touch panel display 142 is configured to be touch-operable over the entire area of the screen. Note that "touch panel displays" may also simply be called "touch panels" or "touch screens".

In the touch panel display 142, for example, an LCD (liquid crystal display) or organic EL (electroluminescence) is used, and operations performed thereon are detected by, for example, a resistive film, capacitance, ultrasonic surface acoustic wave, infrared optical imaging, or electromagnetic induction method. The touch panel display 142 has a built-in pressure sensor 146 that detects pressure touching the screen (in other words, a touch-operable area).

The audio output unit 150 has a speaker 152 and a speaker driver 154 that drives the speaker 152. By driving the speaker 152 using the speaker driver 154, for example, navigation audio, music, or the like stored in the ROM 100C and storage unit 130 is output from the speaker 152.

The vibration unit 160 has a vibrator 162 and a vibrator driver 164 that drives the vibrator 162. The vibrator 162 is configured, for example, using an ERM (eccentric rotating mass), LRA (linear resonant actuator), or piezoelectric actuator. By driving the vibrator 162 using the vibrator driver 164, the screen of the touch panel display 142 vibrates.

The control unit 100 vibrates, for example, the screen of the touch panel display 142 by driving and controlling the vibration unit 160 in response to a touch operation on a widget W.

Figure 3:
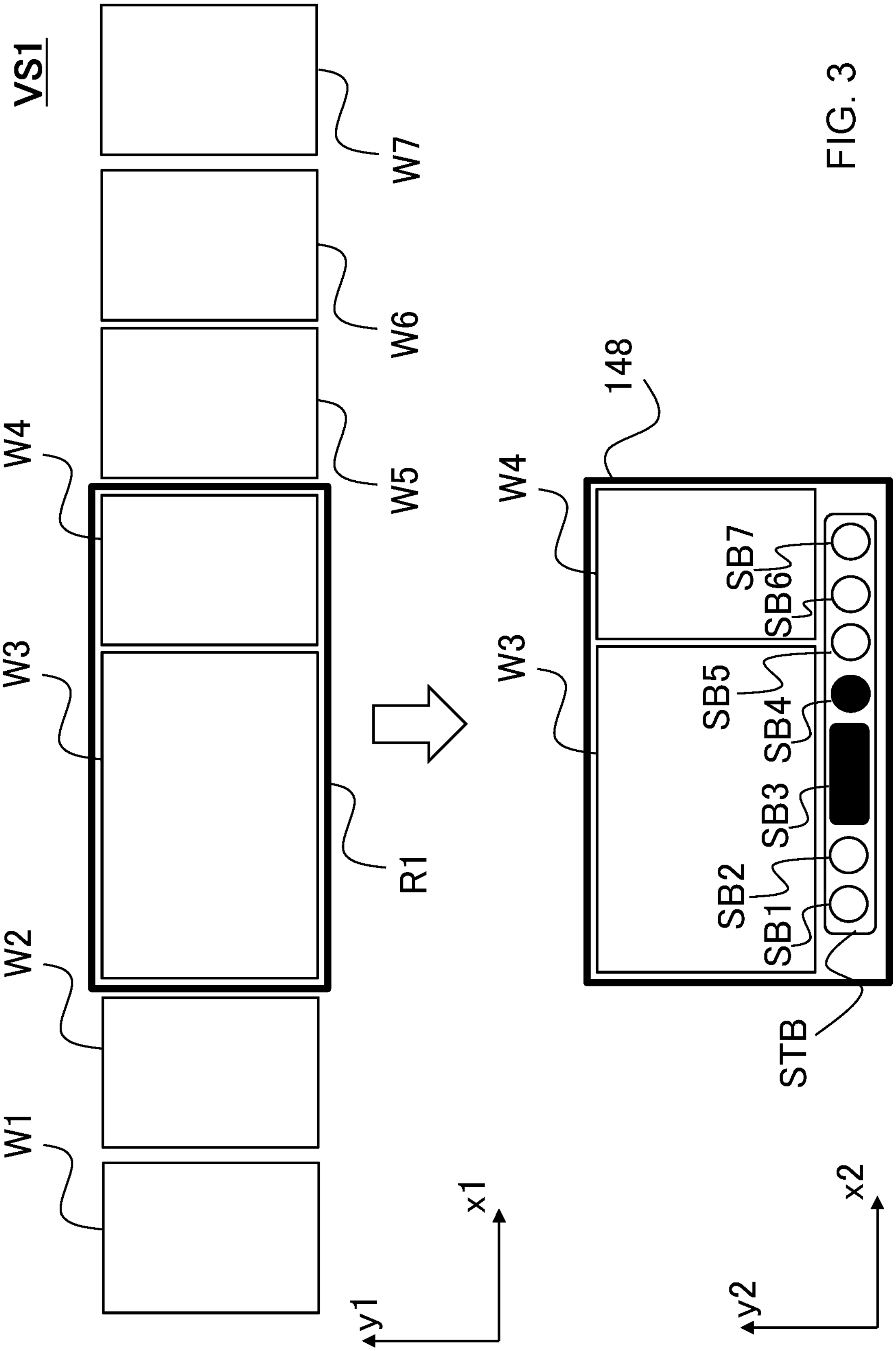
FIG. 3 is a diagram showing a relationship between a virtual space and a display image displayed on a screen.

FIG. 3 is a diagram showing a relationship between the virtual space VS1 and a display image displayed on a screen 148 of the touch panel display 142.

In the example in FIG. 3, the virtual space VS1 is a two-dimensional virtual space. The coordinate system of the virtual space VS1 is a two-axis coordinate system of an x1-axis and a y1-axis, which are mutually orthogonal. The coordinate system of the screen 148 is a two-axis coordinate system, with the screen width direction set as an x2-axis and the screen height direction set as a y2-axis.

In FIG. 3, seven widgets W are individually denoted by the reference alphanumerics W1 to W7. The storage unit 130 stores various information on the widgets W1 to W7 (a set shape, set size, changed shape, changed size, position within the virtual space VS1, component information, and the like). Note that a change to the shape of an object (widget W in the present embodiment) literally refers to the form of the object changing. A change to the size of an object refers to the vertical and horizontal changing at the same ratio while the form of the object is retained. Changing the shape of an object while changing only a vertical size or horizontal size refers to changing both the shape and size of the object In the following, widgets W to which a number is added (that is, the widgets W1 to W7) are denoted only in cases where the widgets are individually demarcated for description. Furthermore, for convenience, the various information relating to the widgets W is denoted "widget information WIF". When describing widget information WIF specific to a widget W1 to W7, the same number as the widget W is added to the widget information WIF. As one example, the widget information WIF for the widget W1 is denoted "widget information WIF1".

According to the set shape and set size included in the widget information WIF, the shape and size of the widget W are determined to be, for example, the shape and size shown in FIG. 3. In the example in FIG. 3, the widgets W1 to W7 have the same height. The widgets W1, W2, and W4 to W7 have the same width. The widget W3 has a width twice that of the other widgets W. The widgets W1, W2, and W4 to W7 have the shape of a vertically-oriented rectangle. The widget W3 has the shape of a horizontally-oriented rectangle.

The set shape and set size included in the widget information WIF is one example of a "preset shape and size". Note that the widget information WIF may be arbitrarily changed by user actions.

For example, users can change the set shape and set size of a widget W. The changed shape and size are respectively recorded in the widget information WIF as "changed shape" and "changed size". Furthermore, for example, users can change the positions of the widgets W within the virtual space VS1, and change the alignment sequence of the widgets W.

The control unit 100 reads-out widget information WIF stored in the storage unit 130 and arranges the widgets W in the virtual space VS1 according to the read-out widget information WIF. Each component of the widgets W is arranged, for example, within the widgets W in an initial preset layout.

The storage unit 130 stores hardware information (screen 148 size, aspect ratio, resolution, and the like) of the touch panel display 142. The control unit 100 sets the area R1 to have a shape and size according to this hardware information, and sets the position of the area R1 within the virtual space VS1. In the example in FIG. 3, when initiating display of the widgets W, the initial position of the area R1 is set to a position that accommodates the widget W3 and the widget W4.

Note that the control unit 100 may arrange (portray) only a portion of the widgets W (for example, widgets W positioned in the vicinity of the area R1) in the virtual space VS1. In this case, when the area R1 moves, widgets W positioned in the vicinity of the moved area R1 are portrayed in the virtual space VS1.

The control unit 100 generates screen data for the area R1 (in the example in FIG. 3, the screen data includes the widget W3 and the widget W4), and the generated screen data is maintained, for example, in a video memory area allocated to a portion of the RAM 100B, and is output to the display unit 140. This allows the widget W3 and the widget W4 to be displayed on the screen 148 as illustrated in FIG. 3.

Note that a status bar STB is displayed on the screen 148 for users to intuitively grasp the status of the widgets W, as relating to the screen display. The details of this status bar STB are described below.

Figure 4:
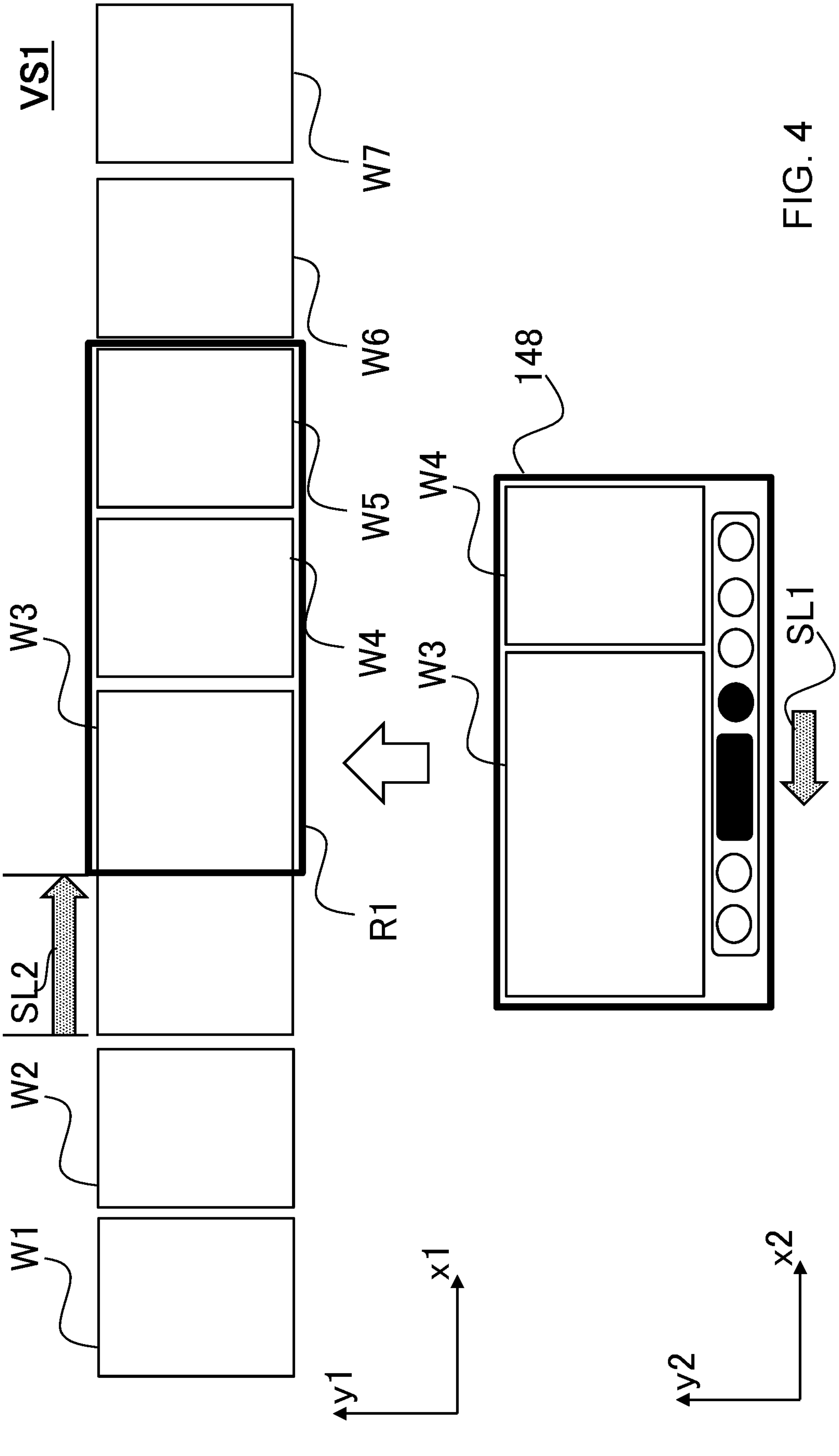
FIG. 4 is a diagram showing a relationship between the virtual space and a display image displayed on the screen.

FIG. 4 is also a diagram showing a relationship between the virtual space VS1 and a display image displayed on the screen 148 of the touch panel display 142.

The control unit 100 receives a scrolling operation on the screen 148 in the direction of the arrow SL1 (left-hand direction of the screen). The position of the area R1 within the virtual space VS1 moves in response to the received scrolling operation. By generating and outputting screen data for the area R1 according to a frame rate, the widgets W are displayed as scrolling on the screen 148.

Users can conduct scrolled display of the widgets W by swiping on the screen 148, and can conduct scrolled display of the widgets W via operation of the dial or button included in the operation unit 120.

In the present embodiment, the minimum scroll amount unit is the width of one of the widgets W1, W2, and W4 to W7. Note that the minimum scroll amount unit is not limited to this. An example is given later, but the minimum scroll amount unit may be smaller. For convenience, the minimum scroll amount unit is denoted "scroll amount MIN".

For example, when a scrolling operation in the left-hand direction of the screen is continued, the scrolling screen stops at the position where the widget W7 on the rightmost side is displayed. Furthermore, for example, when a scrolling operation in the right-hand direction of the screen is continued, the scrolling screen stops at the position where the widget W1 on the leftmost side is displayed.

Furthermore, the scrolling screen may cycle without stopping. For example, when a scrolling operation in the left-hand direction of the screen is performed in a state where the widgets W5 to W7 are displayed in order from the left of the screen, the screen scrolls and the widgets W6, W7, and W1 are displayed in order from the left of the screen. Furthermore, for example, when a scrolling operation in the right-hand direction of the screen is performed in a state where the widgets W1 to W3 are displayed in order from the left of the screen, the screen scrolls and the widgets W7, W1, and W2 are displayed in order from the left of the screen.

As illustrated in FIG. 4, when the area R1 is moved the width of one of the widgets W1, W2, and W4 to W7 (see reference alphanumeric SL2 in FIG. 4), screen data in the area R1 is generated and output as-is, and only the right half of the widget W3 is displayed on the screen 148. As such, visibility of the widget W3 is significantly reduced.

To prevent such reductions in visibility, the control unit 100 executes a display control process, described subsequently, by means of the display control program 102.

Figure 5:
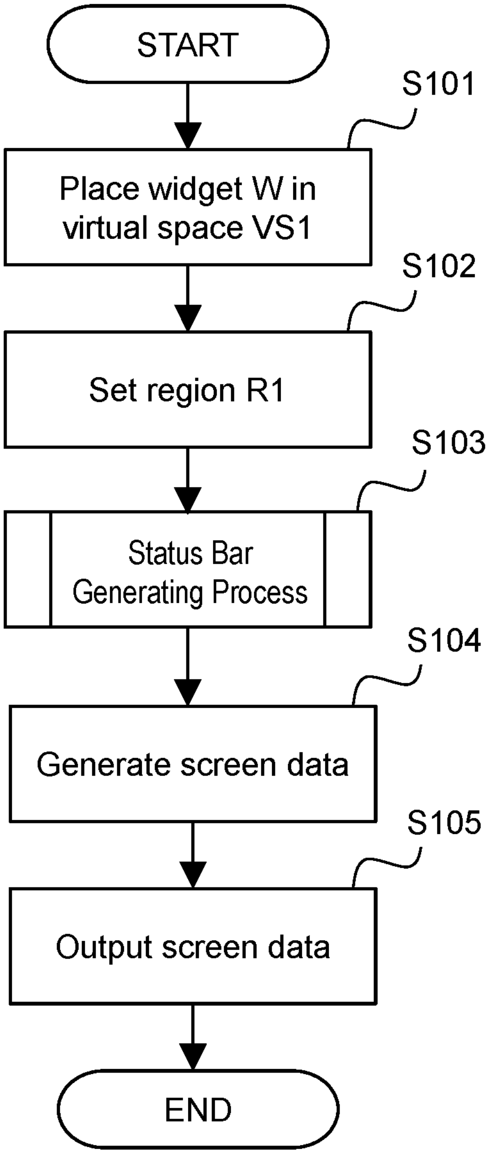
FIG. 5 is a diagram showing a flowchart of a first display control process executed by a control unit of the display control device in one embodiment of the present application.

FIG. 5 depicts a flowchart of a first display control process executed by the control unit 100. The control unit 100 initiates, for example, the first display control process upon detecting a user operation instructing display of a widget W.

The control unit 100 arranges each of the widgets W in the virtual space VS1 according to the widget information WIF of each of the widgets W (step S101).

The control unit 100 sets the area R1 to have a shape and size according to the hardware information of the touch panel display 142, and sets a prescribed position of the area R1 within the virtual space VS1 (step S102).

The control unit 100 generates the status bar STB (step S103).

Figure 6:
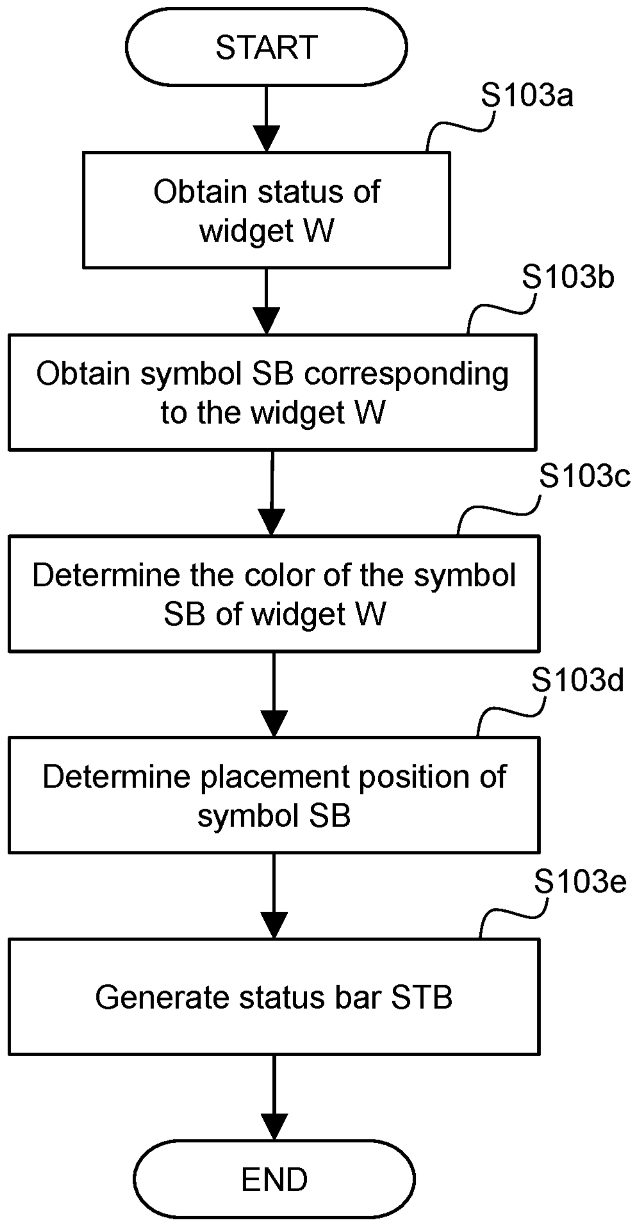
FIG. 6 is a diagram showing a subroutine of the status bar generation process (step S103) in FIG. 5.

FIG. 6 depicts a subroutine of the status bar generation process (step S103).

The control unit 100 acquires the status of each of the widgets W, as relating to the screen display (step S103*a*).

Below is a list of statuses of the widgets W, as relating to the screen display:

(1) Positioned within the area R1 (set shape and set size fits in the area R1);

(2) Positioned within the area R1 (changed shape or changed size fits in the area R1);

(3) Positioned outside the area R1.

The storage unit 130 stores symbols SB (image data) representing forms of each set shape and set size of the widgets W. For example, the storage unit 130 stores symbols SB for a first shape and size that correspond to the widgets W1, W2, and W4 to W7, and symbols SB for a second shape and size that correspond to the widget W3, the longitudinal widths of which are greater than those of the first shape and size.

The control unit 100 acquires the symbols SB corresponding to each of the widgets W from within the storage unit 130 (step S103).

The control unit 100 determines a color for the symbol SB of each of the widgets W according to the status acquired in step S103*a* (step S103*c*).

To give an example, the control unit 100 determines the color of a symbol SB for status (1) widgets W to be red. Furthermore, the control unit 100 determines the color of a symbol SB for status (2) widgets W to be blue. Furthermore, the control unit 100 determines the color of a symbol SB of status (3) widgets W to be white.

The control unit 100 determines the alignment position of each symbol SB according to the alignment positions of widgets W arranged in the virtual space VS1 (step S103*d*).

For convenience, the symbols SB representing the widgets W1 to W7 are respectively denoted by the symbols SB1 to SB7. In step S103*d*, the alignment positions of the symbols SB1 to SB7 are determined in order from left to right.

The control unit 100 generates the status bar STB (image data) in which each of the symbols SB are positioned in the alignment positions determined in step S103*d* (step S103*e*).

Thus, the symbols SB, which reflect the status and form (shape and size) of each of the widgets W, are aligned according to the alignment position within the virtual space VS1.

The description returns to that of FIG. 5. The control unit 100 generates screen data (step S104).

Specifically, the control unit 100 generates screen data for the area R1 (in the example in FIG. 3, the screen data includes the widgets W3 and W4), and merges such with the status bar STB.

The control unit 100 maintains the screen data generated in step S104, for example, in the video memory area allocated to a portion of the RAM 100B, and outputs such to the display unit 140 (step S105). This allows, for example, the image shown in FIG. 3 to be displayed on the screen 148.

In the example in FIG. 3, sight of the status bar STB allows users to intuitively grasp the various information, such as, for example, the alignment position of each of the widgets W, the number of widgets displayed on the screen 148 via performance of the scrolling operation, the status of each of the widgets W (displayed on the screen 148, not displayed, or the like), and the form (shape and size) of each of the widgets W.

Thus, the control unit 100 acts as the symbol display unit 200D, which displays the symbols SB respectively representing the plurality of widgets W (one example of an object) on the screen 148. The control unit 100 acting as the symbol display unit 200D displays the symbols respectively representing the plurality of widgets W according to the alignment positions of the plurality of widgets W in the virtual space VS1, and displays the symbols SB representing the widgets W positioned within the area R1 and the symbols SB representing the widgets W positioned outside the area R1, which can be demarcated by different colors or the like.

Furthermore, the control unit 100 acting as the symbol display unit 200D displays the symbols SB respectively representing the plurality of widgets W in a form exhibiting a preset shape and size (for example, the first size and second size described above) of the widgets W.

Figure 7:
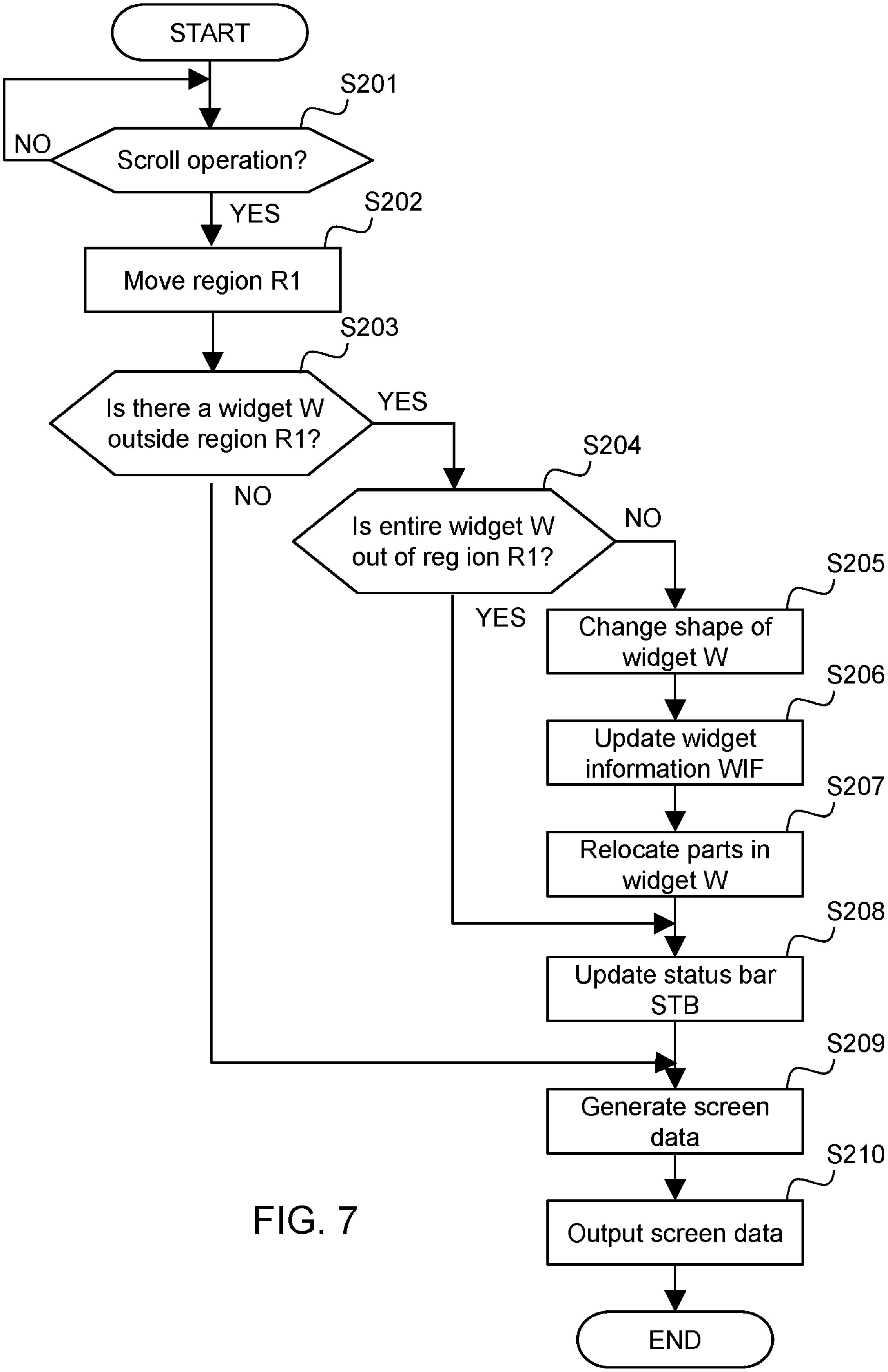
FIG. 7 is a diagram showing a flowchart of a second display control process executed by the control unit of the display control device in one embodiment of the present application.

FIG. 7 depicts a flowchart of a second display control process executed by the control unit 100. The control unit 100 initiates execution of the second display control process when, for example, the image shown in FIG. 3 is displayed on the screen 148 by execution of the first display control process.

The control unit 100 awaits a scrolling operation on the screen 148 (step S201).

When the control unit 100 detects and receives a scrolling operation on the screen 148 (step S201: YES), the area R1 moves in response to an amount of scrolling thereof (step S202).

Thus, the control unit 100 acts as the operation reception unit 200A, which receives scrolling operations on the screen 148, on which a portion of the widgets W among the plurality of widgets W arranged in the virtual space VS1 are displayed.

Furthermore, the control unit 100 updates the area R1 within the virtual space VS1 displayed on the screen 148 in response to a scroll amount received by the operation reception unit 200A, acting as the area updating unit 200B.

The control unit 100 detects, in the moved area R1, widgets W at least partially outside the area R1 (step S203).

Figure 8:
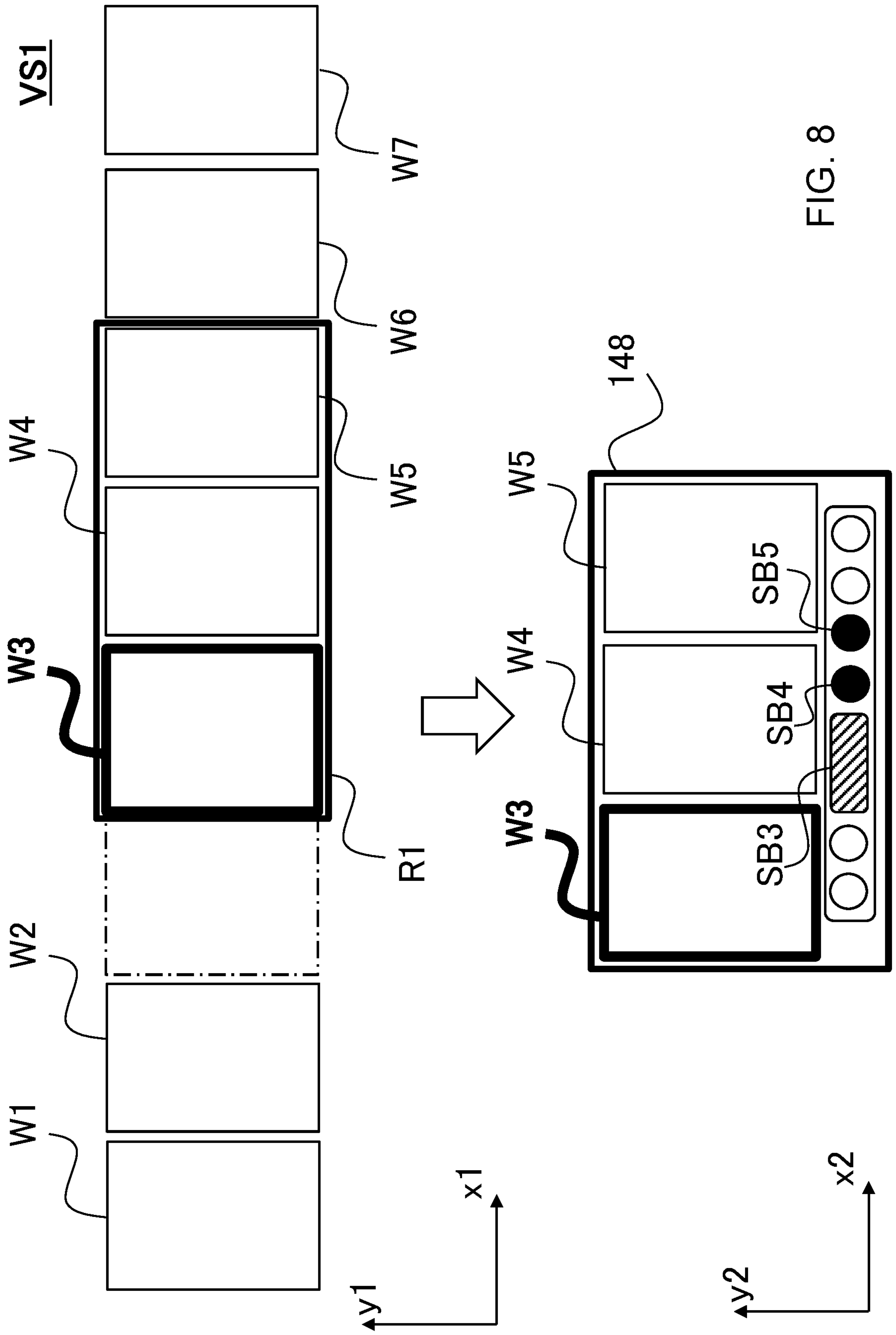
FIG. 8 is a diagram showing a relationship between the virtual space and the display image displayed on the screen.
Figure 9:
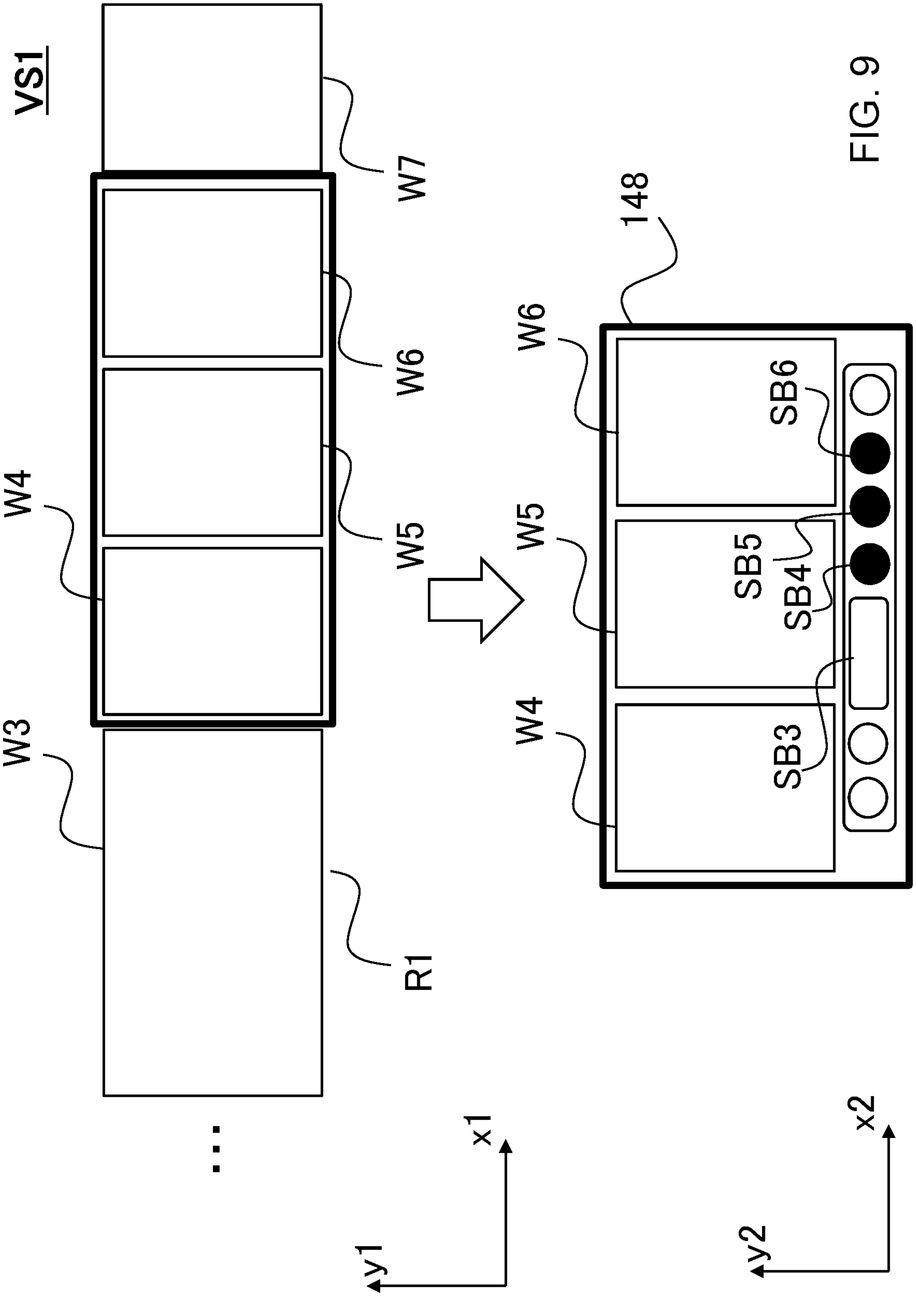
FIG. 9 is a diagram showing a relationship between the virtual space and the display image displayed on the screen.

FIGS. 8 and 9 are diagrams showing a relationship between the virtual space VS1 and the display image displayed on the screen 148 of the touch panel display 142 during execution of the second display control process.

Upon detecting, in the moved area R1, a widget W at least partially outside the area R1 (step S203: YES), the control unit 100 determines whether an entirety of this widget W is outside the area R1 (step S204).

When, in the moved area R1, a widget W is only partially outside the area R1 (step S204: NO), the control unit 100 changes at least either the shape or size of this widget W (step S205).

In the example in FIG. 4, as a result of a scrolling operation, the left half of the widget W3 (that is, a portion) is outside the area R1. In this case, the control unit 100 changes the widget W3 to a vertically-oriented rectangle having the same width and height as the other widgets so that the widget W3 fits within the area R1 (see FIG. 8). Note that, for convenience, the drawings from FIG. 8 onward depict pre-changed widgets W with a dotted line, and changed widgets W with a solid line.

The vertically-oriented rectangle described above is the largest shape and size in the moved area R1 that can accommodate the widget W3. That is, the control unit 100 acting as the object changing unit 200C changes, in the moved area R1, to the largest shape and size in the moved area R1 that can accommodate the widget W partially outside the area R1.

The control unit 100 updates the "changed shape" and "changed size" information included in widget information WIF3 to the shape and size of the changed widget W3 (step S206).

For widgets W whose shape and size have been changed, the control unit 100 rearranges components within the widget W (step S207).

"Component information" included in the widget information WIF includes a priority attached to each component. The control unit 100 conducts rearrangement of the components based on this priority according to a prescribed algorithm. To give an example, the control unit 100 rearranges components to positions that are near their prearranged positions by highest priority, and does not rearrange low priority components (in other words, low priority components are not displayed within the changed widget).

The control unit 100 updates the status bar STB (step S208). In the example in FIG. 8, the widget W3 is first fit within the area R1 by taking on the changed shape and changed size. As such, the color of a symbol SB3 is updated to blue. Furthermore, the widget W5 is fit within the area R1 anew. As such, the color of a symbol SB5 is changed to red.

Thus, the control unit 100 acts as the symbol display unit 200D, displaying the symbol SB (for example, the symbol SB3) representing the widget W having at least either the shape or size changed by the object changing unit 200C, which can be demarcated from the symbols SB representing the other widgets W (here, the color of the symbol SB3 is displayed as blue).

The control unit 100 generates image data as in steps S104 and S105 in FIG. 5 (step S209) and outputs such to the display unit 140 (step S210).

This allows, for example, the image shown in FIG. 8 to be displayed on the screen 148. In addition to the widget W4, this screen 148 displays the widget W5, which is displayed anew by scrolling, and the entirety of the widget W3, whose shape and size have been changed, is displayed. As such, the widget W5 arranged at the scrolling destination becomes visible, and reduction in visibility of the widget W3 is suppressed.

Thus, when there is, in the area R1 updated by the area updating unit 200B, a widget W partially outside the area R1, the control unit 100 acts as the object changing unit 200C, changing the shape and size of the widget W so that the widget W fits within the area R1.

FIG. 9 depicts a case where, in a moved area R1, the entirety of the widget W3 is outside the area R1 (step S204: YES).

In this case, the control unit 100 updates the status bar STB (step S208). Specifically, the control unit 100 updates the color of the symbol SB3 to white and updates the color of the symbols SB5 and SB6 to red. Subsequently, the control unit 100 generates image data (step S209) and outputs such to the display unit 140 (step S210). The screen 148 displays the widgets W4 to W6.

Note that, for example, in the case where the widgets W4 to W6 are displayed on the screen 148 (see FIG. 9), when scrolling is conducted only the scroll amount MIN in the right-hand direction of the screen, the area R1 moves, and the right half of the widget W3 enters into the area R1 (that is, partially). In this case, the control unit 100 changes the shape and size thereof so that the entirety of the widget W3 fits within the area R1. This allows the widget W3 to be displayed on the screen 148 as a vertically-oriented rectangle (changed shape and size) as illustrated in FIG. 8.

When scrolling is further conducted only the scroll amount MIN in the right-hand direction of the screen from this state, the area R1 further moves, and the entirety of the widget W3 fits in the area R1. In this case, the control unit 100 returns the widget W3 to its original shape and size (set shape and set size). This allows the widget W3 to be displayed on the screen 148 as a horizontally-oriented rectangle (original shape and size) as illustrated in FIG. 3.

Thus, when the widget W changed from its preset shape and size becomes able to fit in the moved area R1 even in its preset shape and size, the control unit 100 acting as the object changing unit 200C returns the widget W to its preset shape and size.

The description provided thus far is a description of exemplar embodiments of the present invention. The embodiments of the present invention are not limited to those described above, and various modifications are possible within the scope of the technical concept of the present invention. For example, appropriate combinations of embodiments and the like that are explicitly indicated by way of example in the specification or obvious embodiments and the like are also included in the embodiments of the present application.

In the above description, the widget 3 is changed from a horizontally-oriented rectangle to a vertically-oriented rectangle in response to a scrolling operation, however, for example, the size of the widget W3 may be scaled-down alone to fit within the area R1, maintaining the horizontally-oriented rectangle as-is (that is, the widget W3 may be scaled-down vertically and horizontally at the same ratio while the form of the widget W3 is maintained as-is). Furthermore, the widget W3 may be changed from a rectangle to another form such as a circle or polygon.

That is, when there is, in the area R1 updated by the area updating unit 200B, a widget W partially outside the area R1, the control unit 100 acting as the object changing unit 200C may change, among the shape and size of the widget W, the size alone, so that the widget W fits within the area R1.

In the embodiment described above, the scroll amount MIN, being the minimum scroll amount unit, is one width of the widget W1, however, the scroll amount MIN may be smaller.

Figure 10:
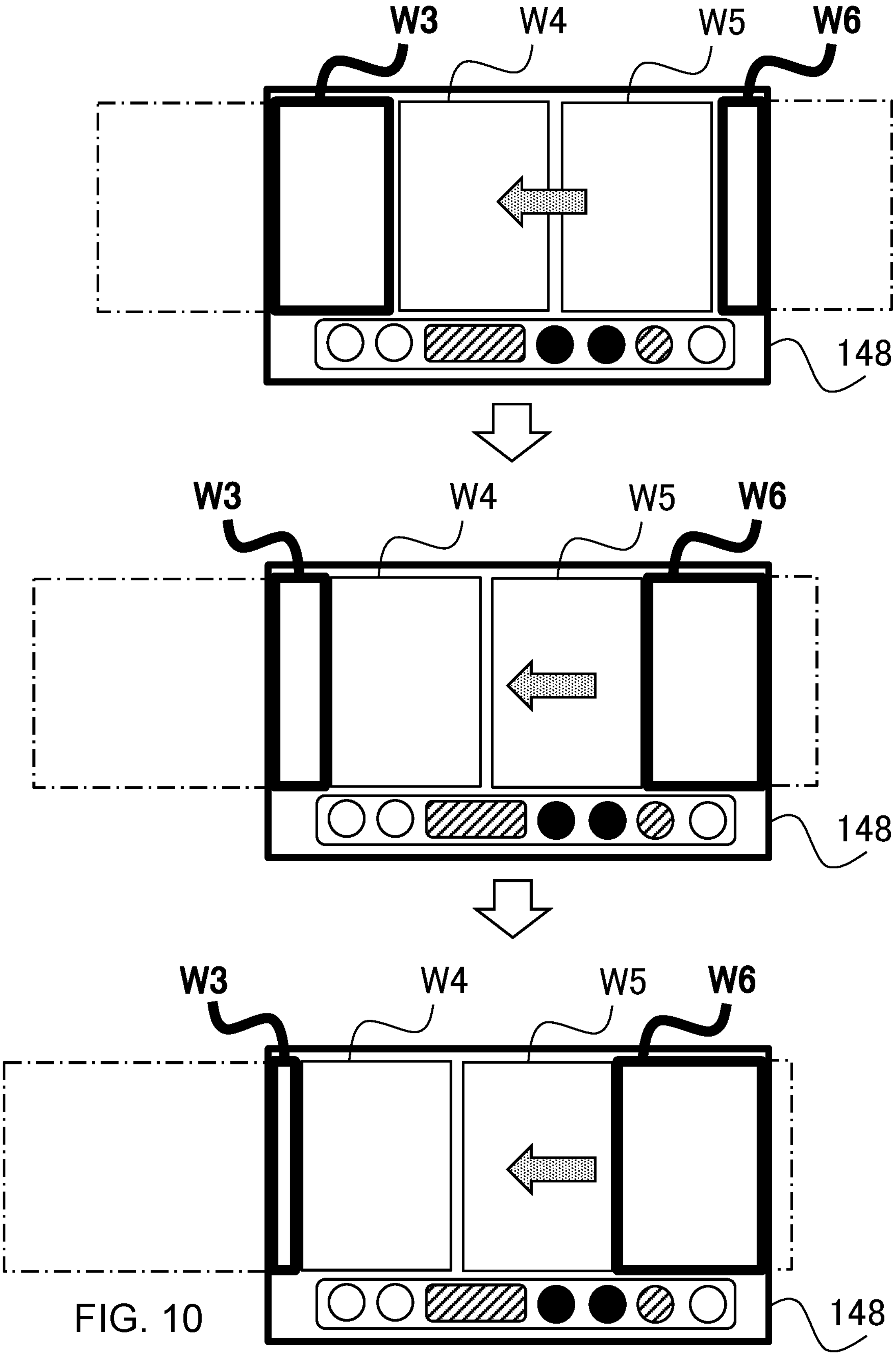
FIG. 10 is a diagram showing a change to a widget when scrolling.

FIG. 10 depicts an example screen where the scroll amount MIN is smaller. For example, when scrolling is conducted in the right-hand direction of the screen from the state in FIG. 3, as shown in FIG. 10, the widget W3 gradually changes to a vertically-oriented rectangular shape as the width (horizontal size) gradually decreases, and the widget W6 gradually changes to a horizontally-oriented rectangular shape as the width (horizontal size) gradually increases. When scrolling is conducted until the widget W3 does not fit in the area R1, until the widget is narrower than the width (in other words, the size) corresponding to the scroll amount MIN, as illustrated in FIG. 9, the entirety of the widget W3 moves outside the area R1 and ceases to be displayed on the screen 148.

That is, the control unit 100 acting as the object changing unit 200C changes the size of a widget W in increments of a prescribed unit (for example, a scroll amount MIN unit), between a preset size and a size corresponding to the scroll amount MIN (minimum scroll amount unit), and in cases where the widget W does not fit in the area R1 until the widget is smaller than the size corresponding to the scroll amount MIN, the widget W does not fit within the area R1.

Figure 11:
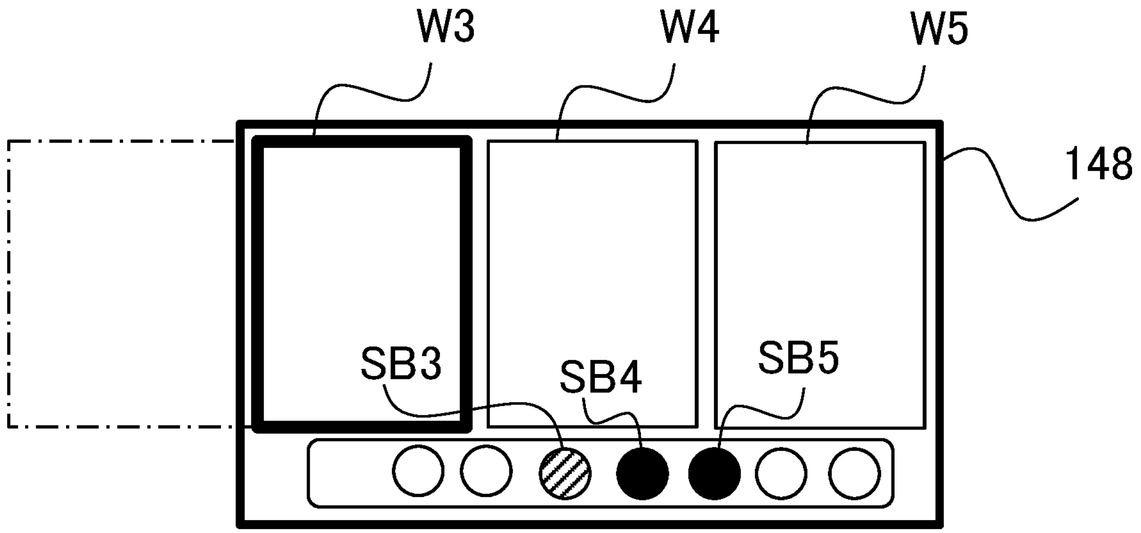
FIG. 11 is a diagram showing another display form of the status bar displayed on the screen.
Figure 12:
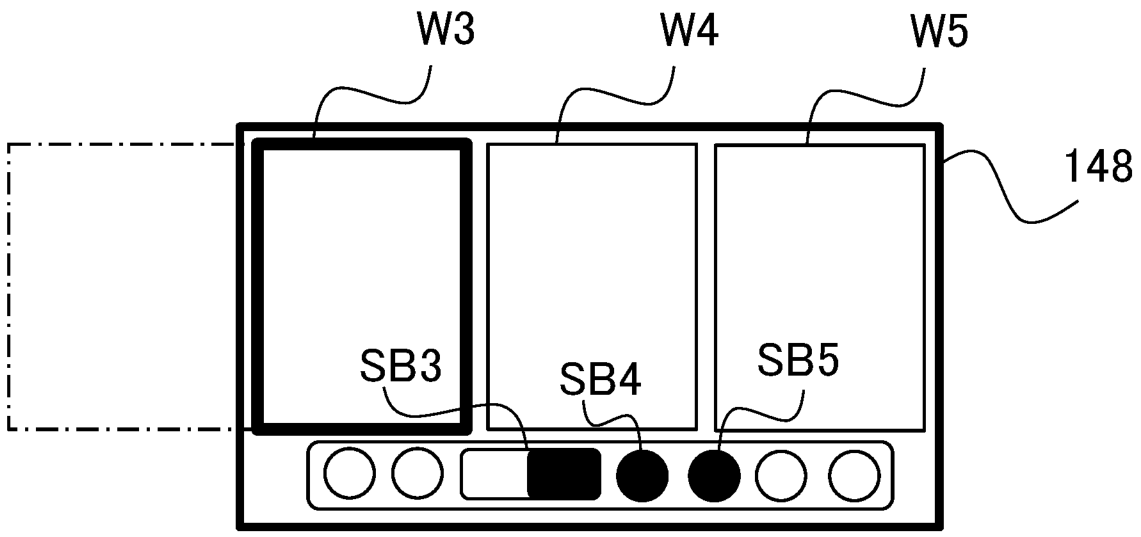
FIG. 12 is a diagram showing another display form of the status bar displayed on the screen.

The display form of the status bar STB is not limited to the embodiment described above. FIGS. 11 and 12 depict other display forms of the status bar STB.

In the example of FIG. 11, all of the symbols SB, including the symbol SB3 representing the widget W3, are displayed in the same shape and size.

In the example of FIG. 12, the symbol SB3 forms having a white portion and a red portion are displayed to express the relationship between the set shape and size and the changed shape and size.

Thus, there is flexibility in the display form of the status bar STB, and a variety of display forms can be employed.

In the embodiment described above, the widgets W are aligned and arranged in a single series in the x1-axis direction of the two-dimensional virtual space VS1, however, examples of widget W arrangement are not limited to this.

Figure 13:
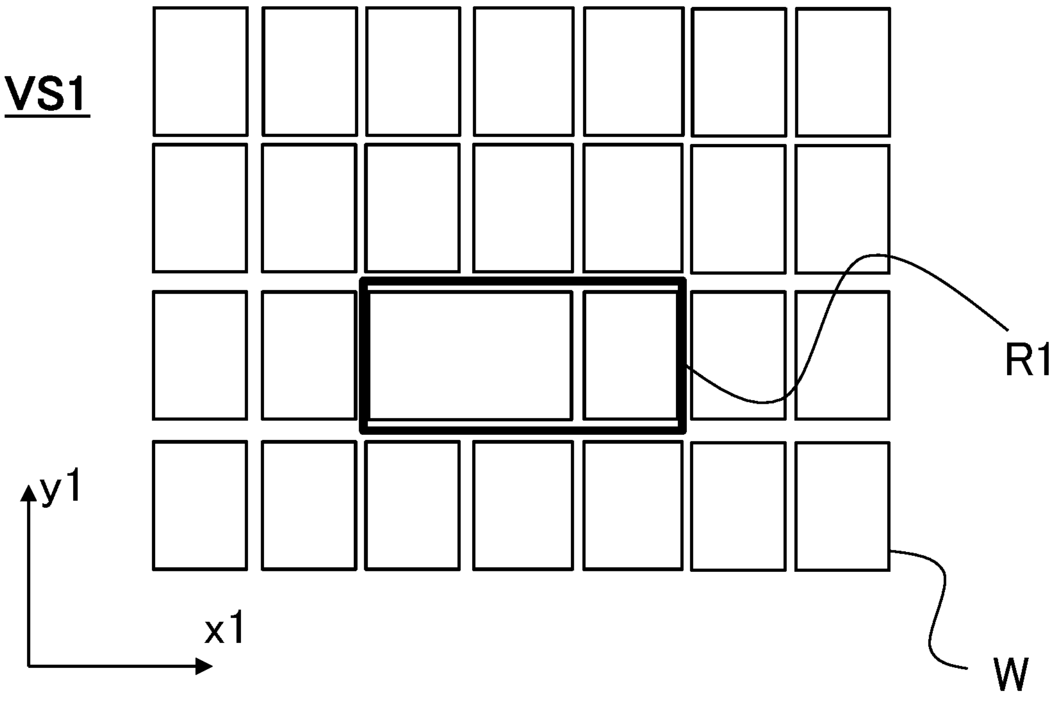
FIG. 13 is a diagram showing an arrangement example of widgets in a two-dimensional virtual space.
Figure 14:
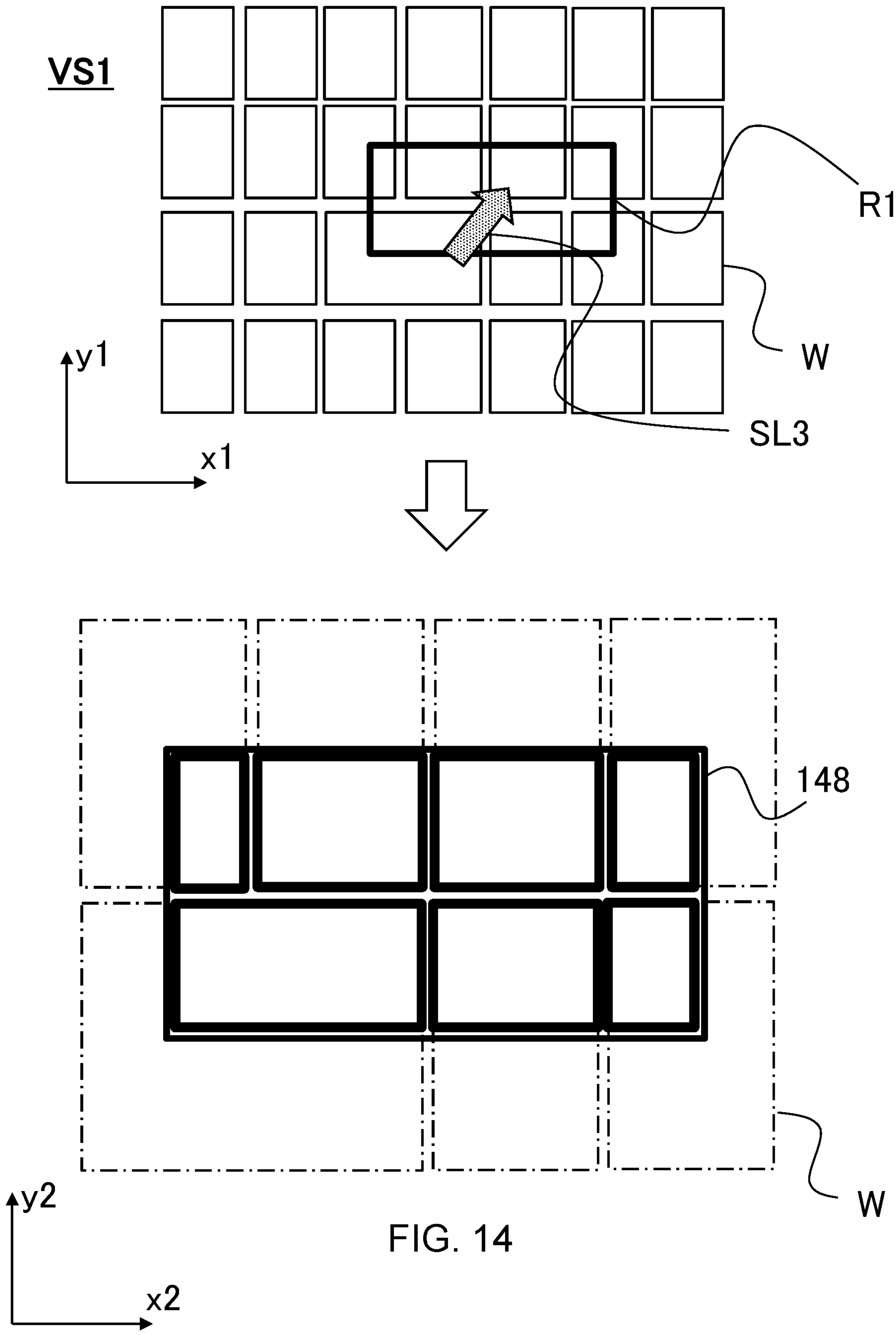
FIG. 14 is a diagram showing an arrangement example of widgets in a two-dimensional virtual space.

FIGS. 13 and 14 depict examples in which widgets W are arranged in the two-dimensional virtual space VS1, aligned not only in the x1-axis direction, but also in the y1-axis direction. Note that in FIGS. 13 and 14, description of the status bar STB is omitted.

In the example in FIG. 13, users can conduct a scrolling operation not only in a left-right direction, but in an up-down direction or diagonal direction as well. For example, when scrolling is conducted in the direction of the arrow SL3 from the state in FIG. 13, as illustrated in FIG. 14, the area R1 moves diagonally in the upper-right direction in the virtual space VS1. This changes the shape and size of the widget W only partially outside the area R1 to fit within the area R1, and as illustrated in FIG. 14, is displayed on the screen 148.

In the example in FIG. 13, users can also perform a rotation operation. When the rotation operation is performed, the area R1 in the virtual space VS1 rotates in-place. When, in a rotated area R1, a widget W is only partially outside the area R1, this widget W is also changed such that at least either a shape or size fits within the area R1, and is displayed on the screen 148.

Figure 15:
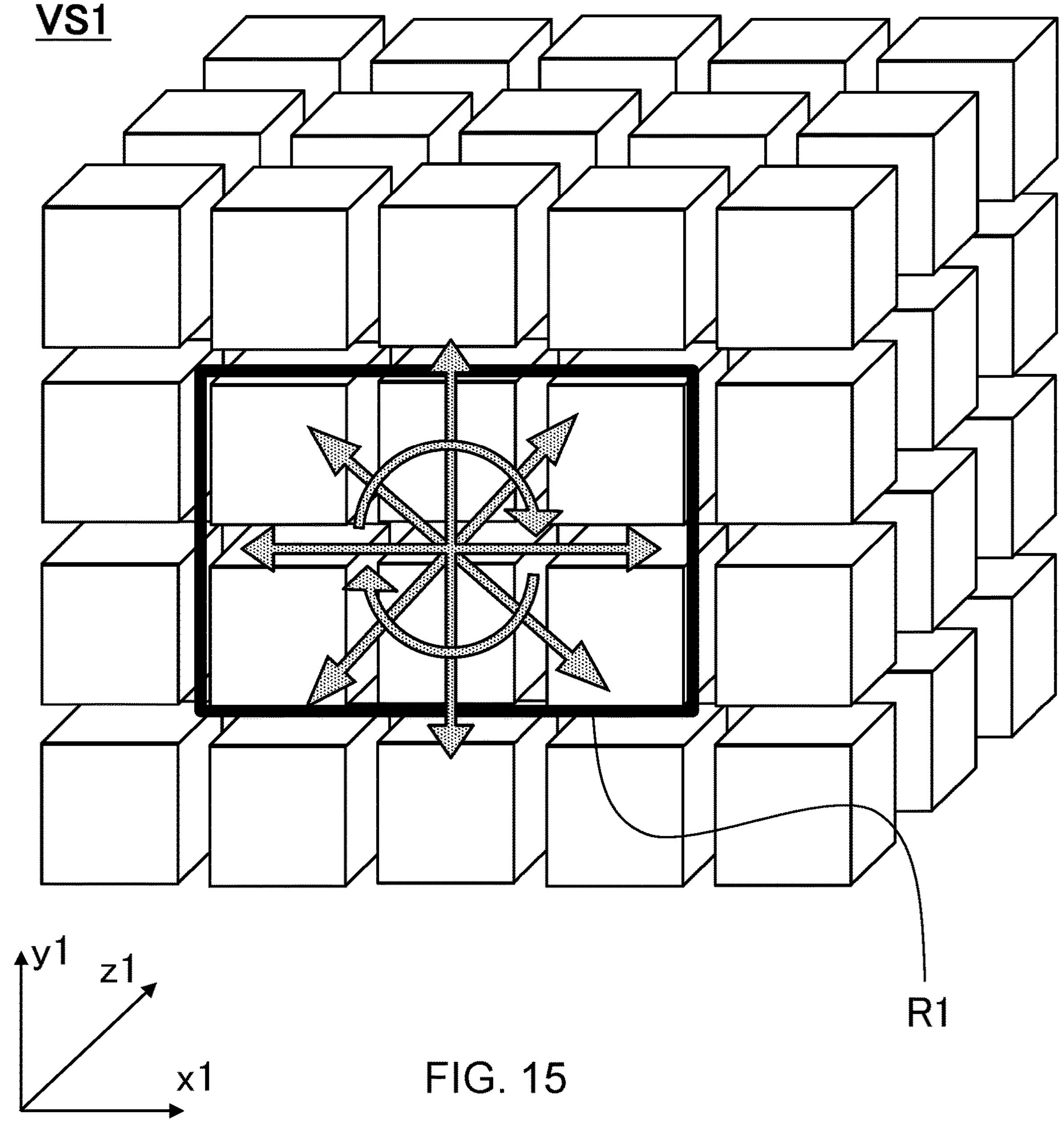
FIG. 15 is a diagram showing an arrangement example of widgets in a three-dimensional virtual space.

FIG. 15 depicts an example in which widgets W are arranged in a three-dimensional virtual space VS1, aligned not only in the x1-axis direction and the y1-axis direction, but also in the z1-axis direction. The arrows in FIG. 15 schematically depict the scrollable directions. Note that likewise in FIG. 15, description of the status bar STB is omitted.

In the example in FIG. 15, users can conduct a scrolling operation in a depth direction (z1-axis direction) in addition to the left-right directions, up-down directions, and diagonal directions. To give an example, scrolling is performed in a depth direction in response to a double-tap, long-press, or other operation on the screen 148. Likewise in the example in FIG. 15, users can also perform a rotation operation.

In the example in FIG. 15, the area R1 is defined as a projection plane. The screen 148 displays a projection plane of widgets W arranged in the virtual space VS1 which are projected onto the projection plane. When a widget W transformed by projection into the area R1 is only partially outside the area R1, this widget W is changed such that at least either a shape or size fits within the area R1, and is displayed on the screen 148.

In the example in FIG. 15, the widgets W have a three-dimensional shape. In the example in FIG. 15, the widgets W may have a flat shape as in the embodiment described above.

What is claimed is:

1. A display control device, comprising:
a control unit;
a memory configured to store a virtual space; and
a display configured to display a screen in which a partial area of the virtual space is displayed,
wherein the control unit is configured to:
receive scrolling operations on the screen, a plurality of objects is arranged in the virtual space and some of the plurality of objects are displayed on the screen;
update the partial area within the virtual space stored in the memory in response to a scroll amount of the scrolling operations; and
when at least part of a particular object among the plurality of objects is outside the updated partial area, change a shape or size of the particular object so that an entirety of the particular object fits within the updated partial area.

2. The display control device according to claim 1, wherein the control unit is configured to update the particular object to a largest shape and size accommodated by the updated partial area.

3. The display control device according to claim 2, wherein the control unit is configured to change the size of the particular object in increments of predetermined units between a preset size and a size corresponding to the minimum unit of the scroll amount, and does not fit the particular object within the partial area when the particular object does not fit in the partial area unless the particular object is smaller than the size corresponding to the minimum unit.

4. The display control device according to claim 1, wherein the control unit is configured to return the particular object to a preset shape and size when the particular object changed from the preset shape and size becomes able to fit in the updated partial area even in the preset shape and size.

5. The display control device according to claim 1, wherein the control unit is configured to display symbols respectively representing the plurality of objects on the screen, to display the symbols respectively representing the plurality of objects according to the alignment positions of the plurality of objects in the virtual space, and to distinguishably display the symbols representing the objects positioned within the partial area and the symbols representing the objects outside the partial area.

6. The display control device according to claim 5, wherein the control unit is configured to display the symbols representing the objects that have changed at least in its shape or size distinguishably from symbols representing other objects.

7. A display control device, comprising:
a control unit;

a memory configured to store a virtual space; and a display configured to display a screen in which a partial area of the virtual space is displayed, wherein the control unit is configured to:

receive scrolling operations on the screen, a plurality of objects is arranged in the virtual space and some of the plurality of objects are displayed on the screen;

update the partial area within the virtual space stored in the memory in response to a scroll amount of the scrolling operations; and when at least part of a particular object among the plurality of objects is outside the updated partial area, change a shape or size of the particular object so that the particular object fits within the updated partial area, wherein the control unit is further configured to: display symbols respectively representing the plurality of objects on the screen, to display the symbols respectively representing the plurality of objects according to the alignment positions of the plurality of objects in the virtual space, to distinguishably display the symbols representing the objects positioned within the partial area and the symbols representing the objects outside the partial area, and to display the symbols respectively representing the plurality of objects in a form exhibiting preset shapes and sizes of the objects.

8. A display control method, comprising the steps of:

receiving scrolling operations on a screen in which a partial area of a virtual space is displayed, a plurality of objects is arranged in the virtual space and some of the plurality of objects are displayed on the screen;

updating the partial area within the virtual space displayed on the screen in response to a received scroll amount of the scrolling operations; and in response to at least part of a particular object among the plurality of objects being outside the updated partial area, changing a shape or size of the particular object so that an entirety of the particular object fits within the updated partial area.

9. The display control method according to claim 8, wherein the particular object is updated to a largest shape and size accommodated by the updated partial area.

10. The display control method according to claim 9, wherein the size of the particular object is changed in increments of predetermined units between a preset size and a size corresponding to the minimum unit of the scroll amount, and the particular object is not fitted within the partial area when the particular object does not fit in the partial area unless the particular object is smaller than the size corresponding to the minimum unit.

11. The display control method according to claim 8, wherein the particular object is returned to a preset shape and size when the particular object changed from the preset shape and size becomes able to fit in the updated partial area even in the preset shape and size.

12. The display control method according to claim 8, further comprising a step of displaying symbols respectively representing the plurality of objects on the screen, wherein the symbols are displayed respectively representing the plurality of objects according to the alignment positions of the plurality of objects in the virtual space, and the symbols representing the objects positioned within the partial area and the symbols representing the objects outside the partial area are distinguishably displayed.

13. The display control method according to claim 12, wherein the symbols are displayed respectively representing the plurality of objects in a form exhibiting preset shapes and sizes of the objects.

14. The display control method according to claim 12, wherein the symbols representing the objects that have changed at least in its shape or size are displayed distinguishably from symbols representing other objects.

* * * * *